United States Patent [19]

Kim

[11] Patent Number: 5,557,591
[45] Date of Patent: Sep. 17, 1996

[54] TRACK COUNTING SERVO CIRCUIT AND METHOD THEREFOR

[75] Inventor: Gee-bong Kim, Suwon, Rep. of Korea

[73] Assignee: Samsung Electronics Co., Ltd., Kyungki-do, Rep. of Korea

[21] Appl. No.: 249,907

[22] Filed: May 26, 1994

[30] Foreign Application Priority Data

May 27, 1993 [KR] Rep. of Korea ............... 93-9360

[51] Int. Cl.⁶ .......................................... G11B 7/00
[52] U.S. Cl. .................... 369/44.28; 1369/44.320; 1369/44.34
[58] Field of Search ............... 369/44.28, 44.25, 369/44.27, 44.29, 44.32, 44.34, 47, 48, 32, 124; 360/77.08, 77.04, 77.05, 75,77.07, 78.01

[56] References Cited

U.S. PATENT DOCUMENTS

| | | | |
|---|---|---|---|
| 4,989,190 | 1/1991 | Kuroe et al. | 369/32 |
| 5,233,486 | 8/1993 | Albert | 360/77.08 X |
| 5,239,530 | 8/1993 | Seo et al. | 369/44.28 X |
| 5,270,988 | 12/1993 | Kobayashi | 369/44.28 X |

*Primary Examiner*—Georgia Y. Epps
*Assistant Examiner*—Muhammad N. Edun
*Attorney, Agent, or Firm*—Sughrue, Mion, Zinn, Macpeak & Seas

[57] ABSTRACT

A track counting servo circuit compensating for track counting errors during high-speed accessing in an optical disk apparatus detects errors in the track count signal as the optical head moves over the tracks to a target track. The circuit produces a rectangular wave, which is consistent with the target speed in the error portion of the detected track count signal, and substitutes the rectangular wave for the error portion of the track count signal. Accordingly, the tracking accessing speed can be increased.

14 Claims, 5 Drawing Sheets

TRACK COUNTING SERVO CIRCUIT AND METHOD THEREFOR

BACKGROUND OF THE INVENTION

1. Field of the Invention

The present invention relates to a track counting servo circuit of an optical disk apparatus, and more particularly, to a track counting servo circuit that compensates for track counting errors to permit accessing the disk at high speeds.

Korean Patent Application No. 93-9360 is incorporated herein by reference for all purposes.

2. Discussion of Related Art

In general, a variety of deviations occurring in an optical disk apparatus such as CD-ROMs, compact disk graphics (CDG) players and compact disk players (CDPs) are compensated by a plurality of servo apparatus. Examples of these servos include a focusing servo, a tracking servo, a constant line velocity (CLV) servo, a feeding servo, etc. The focusing servo is used to compensate by detecting the amount of up-and-down (longitudinal) fluctuation on the track due to the rotation of the disk. The tracking servo is used to compensate by detecting the amount of left-and-right (latitudinal) fluctuation on the track, which is also due to the rotation of the disk. Further, the CLV servo is used to compensate the time value of the data according to the rotational fluctuation of the disk. Also, two methods are classified depending on how the beam spot of the optical disk apparatus is moved. One method is a track jumping method for moving an objective lens, and the other is a sled method for moving the pickup itself. Accordingly, a microscopic tracking servo is used for tracing on the track of a compact disk using the objective lens movement, and a sled servo is used for tracing on the track using the movement of the pickup itself.

In a CD-ROM, the speed at which information is read from the disk determines the quality of the product. This is different from that of a CDG or CDP, where the motor should be accurately controlled in the pickup transportation, track jump and track transportation by means of the sled motor, in order to minimize access time.

FIG. 1 is a block diagram of the conventional servo control circuit. Referring to FIG. 1, the servo control circuit comprises a disk 11; a pickup 12 for reading out the data from disk 11; a radio frequency (RF) amplifier 13 for amplifying the track counting signal detected by pickup 12 when counting the track number; a counter 14 for counting the number of tracks; and a microcomputer 15 for controlling the tracking servo.

Referring to the operation of the servo control circuit having the structure as shown in FIG. 1, microcomputer 15 calculates the number of tracks from a given point to the target track and drives the sled motor, to thereby transport the pickup 12 across as many tracks as calculated. RF amplifier 13 amplifies and outputs the RF signal representing the track being input by means of the moving pickup 12 following the instruction of microcomputer 15. Counter 14 counts the number of tracks being currently input, and if the number is equal to the number of tracks calculated by microcomputer 15, microcomputer 15 produces an instruction to halt the sled motor, so that pickup 12 will stop on the target track.

The conventional movement of the pickup according to the above-described method creates a situation in which the pickup cannot count the tracks for a predetermined duration due to limitations of the signal read frequency and the external impact when the sled is driven at high speeds, and thus the pickup may move beyond the target track by as many tracks as not counted, which becomes a serious problem for high speed access.

SUMMARY OF THE INVENTION

To overcome the above problem, it is an object of the present invention to provide a track counting servo circuit for compensating for the error portion of the track counting signal to thereby minimize the time consumed accessing a track location; i.e. moving the optical pick up to a designated location.

It is another object of the present invention to provide a track counting servo method for compensating for the error portion of the track counting signal to thereby minimize the time consumed by accessing a track location.

To accomplish the above first object, the present invention provides a track counting servo circuit of an optical disk driving apparatus, which comprises a track counter, responsive to a track counting signal read from a disk by means of a pickup, for counting the tracks, to thereby determine the number of tracks to transport the pickup in order to reach a target track; a microcomputer for controlling the movement of the pickup; track counting error detecting means for detecting an error in the read out of the track counting signal; and track counting signal compensating means for compensating for the track counting error to thereby provide a compensating signal for the track counter.

To accomplish the other object, the present invention provides a track counting servo method of a track counting servo circuit having a track counter for counting the tracks using a track counting signal read out from a disk by means of a pickup, to thereby determine the number of tracks to transport the pickup in order to reach a target spot and; a microcomputer for controlling the movement of the pickup; track counting error detecting means for detecting the track counting error occurring in the read out of the track counting signal; and track counting signal compensating means for compensating for the detected track counting error to thereby provide a compensating signal for the track counter, the servo method comprising the steps of:

reading out the track counting signal;

detecting a track counting error from the read-out track counting signal; and producing a corrected track counting signal from said detected error data and the read-out track counting signal.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENT

Figure 2:
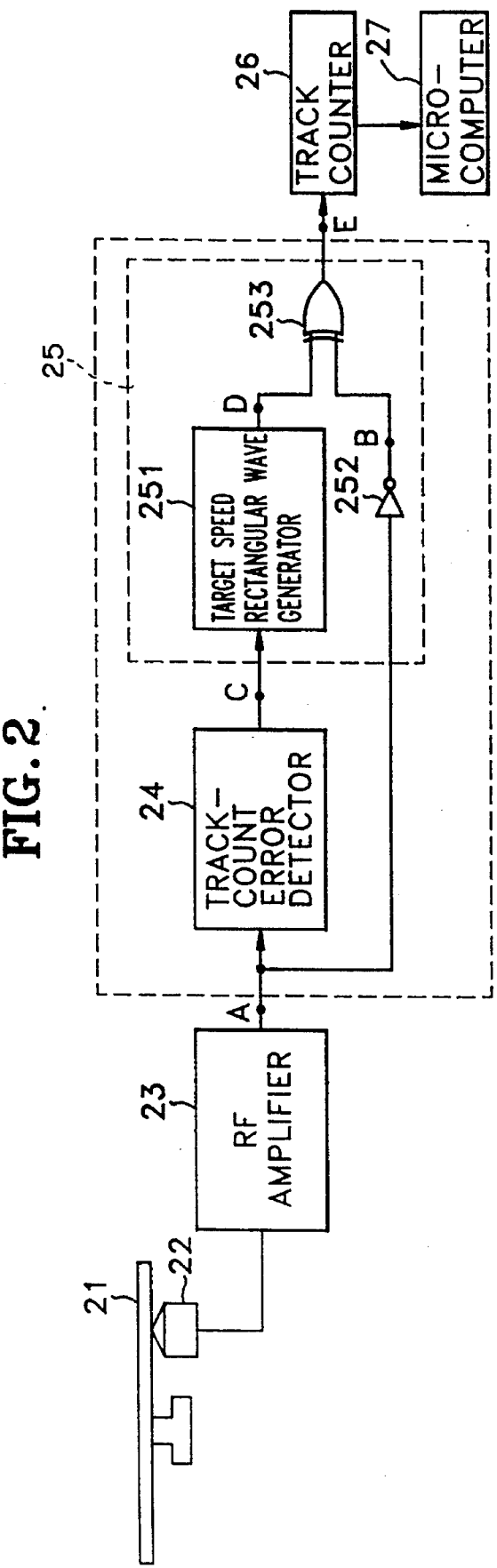
FIG. 2 is a block diagram of a track counting servo circuit according to the present invention.

Referring to FIG. 2, the track counting servo circuit of the present invention comprises an RF amplifier 23 for amplifying the track count signal read out by a pickup 22, which reads out the data from a disk 21; a track counting error detecting means 24 for detecting track count signal errors that occur when the track count signal is read out; a track count signal compensating means 25 for compensating for the detected track count signal error and outputting a corrected track count signal; a track counter 26 for receiving the compensated track count signal to thereby count the track number; and a microcomputer 27 for controlling the tracking servo.

Track count signal compensating means 25 includes a target velocity rectangular wave generator 251 for producing and outputting a high frequency rectangular wave signal during the portion of the track count signal that is in error. The high frequency rectangular wave produced by the generator 251 is consistent with the target velocity of the optical disc, so that when added to the error-free portion of the track count signal, the resulting signal is not too different than would be the track count signal if no error occurred. The track count signal compensating means 25 also includes an inverter 252 for inverting the track count signal output from the RF amplifier 23 to produce a track count signal in which the error portion appears as a logic "low" signal. The rectangular wave signal from the generator 251 and the inverted track count signal from inverter 252 are combined in exclusive OR circuit 253 for performing an exclusive OR operation and producing a compensated track count signal.

Figure 5:
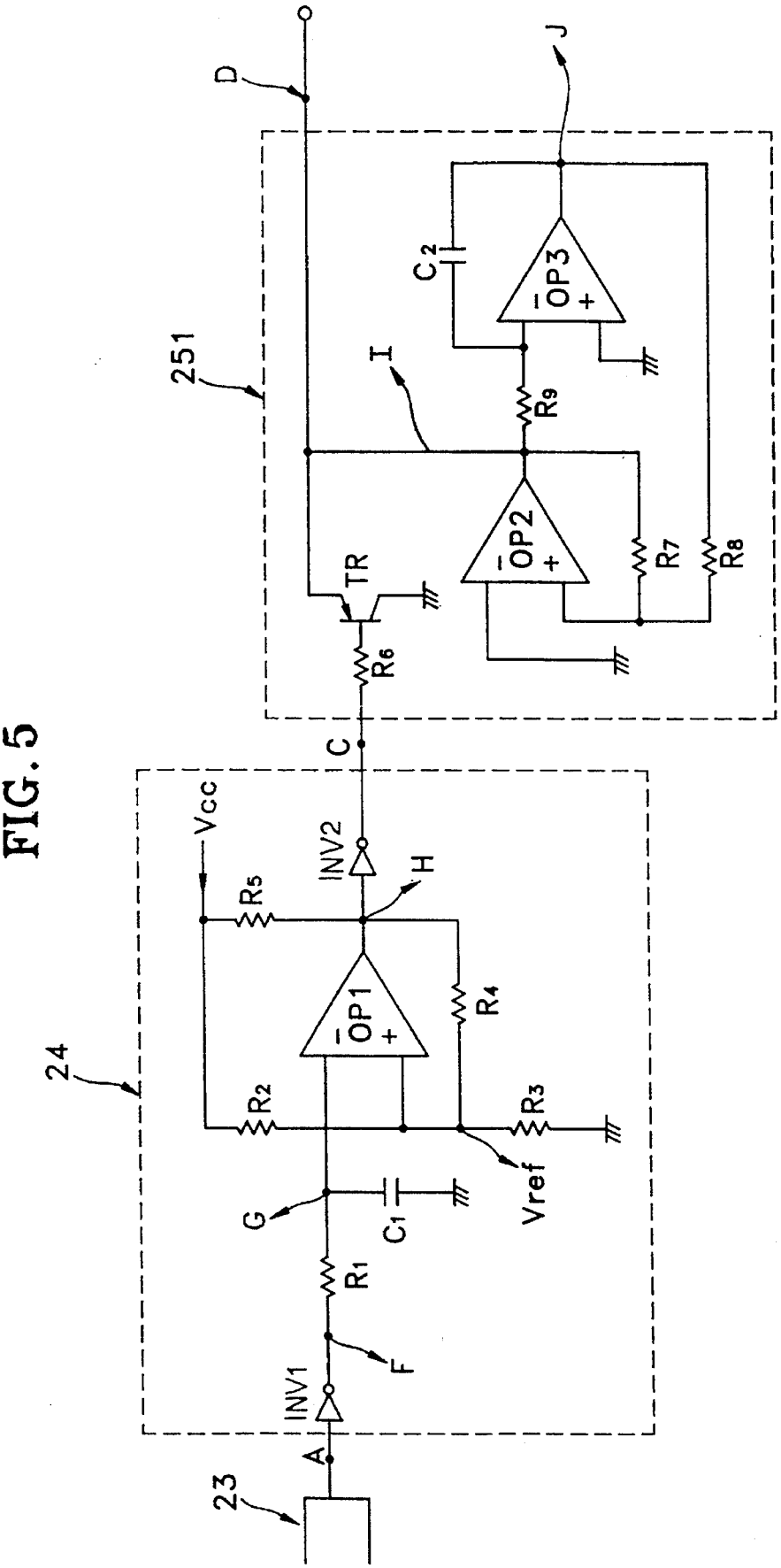
FIG. 5 is a circuit diagram of one example of the track count error detector and target speed rectangular wave generator of FIG. 2.

FIG. 5 is a detailed circuit diagram of the track count error detector 24 and the generator 251 of FIG. 2. FIGS. 3A through 3J show various waveforms present at correspondingly numbered points in the circuit of FIGS. 2 and 5.

Figure 1:
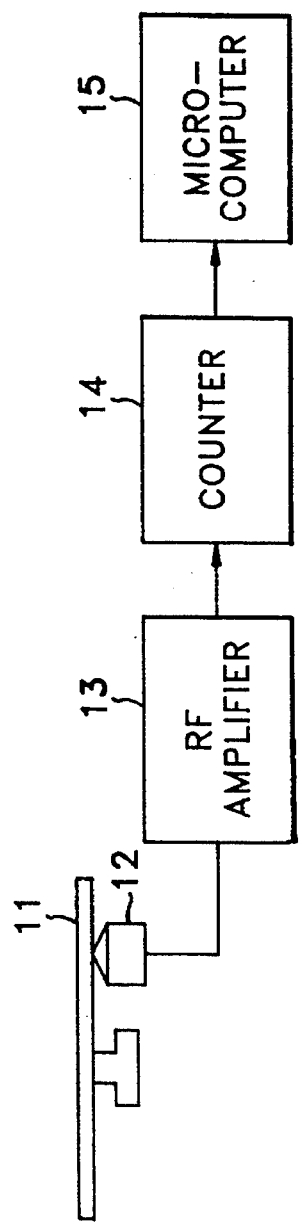
FIG. 1 is a block diagram of the conventional servo control circuit.

Referring to FIG. 5 and the waveforms in FIGS. 3A and 3F through 3J, the waveform at 3A represents the track count signal read from the disc and applied to point A via the RF amplifier 23. The portion E is the error portion. As will be apparent, if this signal were applied to the servo system of the prior art, the portion E would not result in any further track counts in the counter 14 (FIG. 1) and as a result the optical pick up would move significantly past the target track.

In the system of the present invention, the portion E will be filled with a pseudo track count signal, which approximates the actual track count signal. The signal in 3A, applied to the point A in FIG. 5, in inverted, thereby resulting in the inverted signal 3F appearing at point F. It will be appreciated that an inverter has a threshold level such that the error portion appears only as a low level voltage during the portion E. The waveform 3F is applied to an integrator comprising resistor $R_1$ and capacitor $C_1$ where it is integrated. The integrated signal is shown in FIG. 3G and appears at point G in FIG. 5. It will be noted that since the signal at point F has a relatively high frequency, the integrated signal level drops only slightly from its peak before rising again, except during the portion E, where the signal 3F remains at a low level.

The waveform 3G is applied to a Schmidt trigger circuit comprising an operational amplifier OP1 and resistors $R_2$ through $R_5$. The Schmidt trigger produces a square wave signal 3H at point H. The square wave signal produces a two level voltage signal, with the low level coincident with the error portion E of the track count signal. The latter square wave signal is inverted in an inverter INV2 to produce the signal 3C at point C and shown in FIG. 3C. Also, as seen in FIG. 2, the track count error detector 24 receives the signal 3A at point A and produces the signal 3C at point C.

Signal 3C is applied to the target speed rectangular wave generator 251 of the track count signal compensating means 25. The latter comprises conventional Schmidt triggers including operational amplifiers OP2 and OP3 and associated resistors $R_7$ through $R_9$ and capacitor $C_2$, which produce a triangular wave (FIG. 3J) at the output of operational amplifier OP3 and produce a rectangular wave (FIG. 3I) at the terminal I at the output of the operational amplifier OP2. The frequency f of the rectangular wave 3I is defined as:

$$f = \frac{C_2}{4R_9} \left( \frac{R_7}{R_8} \right)$$

This rectangular wave (FIG. 3I) has a frequency which approximates the target speed of the optical head across the tracks during a track access operation. The rectangular wave is continuous, but is grounded by transistor TR when turned on. The transistor is a PNP transistor, which has the waveform 3C applied to the base thereof, resulting in the transistor being turned on at all times except during the period E, defined by the high level portion of waveform 3C. As a result the rectangular waveform at frequency f appears at the output terminal D of generator 251 only during the error period E. The complete signal appearing at D is shown in FIG. 3D. Terminal D is also indicated in FIG. 2.

Figure 3A:
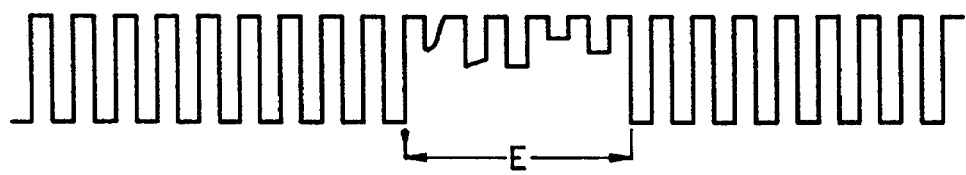
FIGS. 3A–3J show various waveforms present at respective portions of the track count servo circuit according to an embodiment of the present invention.
Figure 3B:
Figure 3C:
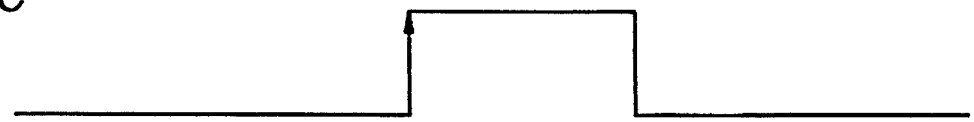
Figure 3D:
Figure 3E:
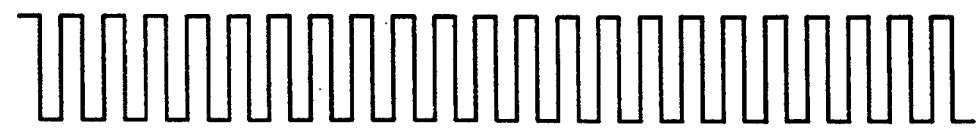
Figure 3F:
Figure 3G:
Figure 3H:
Figure 3I:
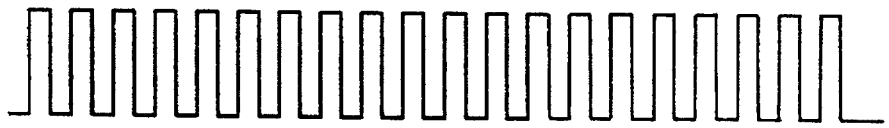
Figure 3J:

The output at terminal D, represented by the signal in FIG. 3D, and the output from an inverter 252, represented by the signal in FIG. 3B, are combined in an exclusive OR circuit 253, resulting in the waveform shown in FIG. 3E. As can be seen, in effect, the error portion of the track count signal is "cut out" and replaced by the rectangular wave portion (FIG. 3D) to result in a track compensated count signal that is then applied to the track counter in the manner of the prior art. The output of the track counter is applied to a microcomputer, also in the manner of the prior art, whereby the track servo operation is carried out and the optical head is moved to the target track at high speed with minimum overshoot.

Figure 4:
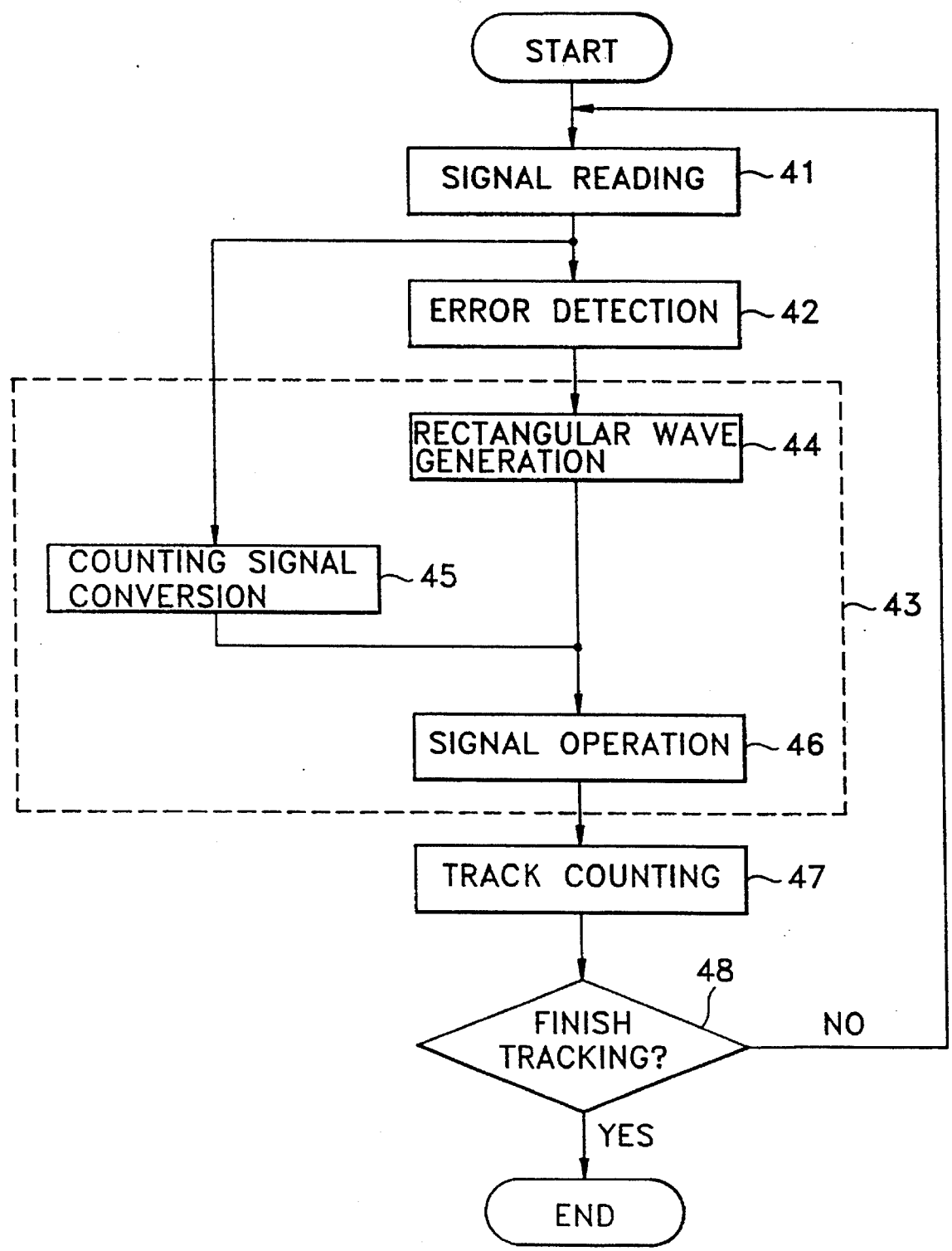
FIG. 4 is a flow chart illustrating the track counting servo method of the present invention.

FIG. 4 is a flow chart showing the formation of the correction signal according to the track counting servo method of the present invention.

Referring to FIG. 4, the track counting servo method comprises a signal-reading-out step 41 for reading out the track count signal; an error-detecting step 42 for detecting a track count signal error from the read out track count signal; and a correction-signal-forming step 43 for producing a corrected track counting signal, which is corrected by means of the detected error data and the read out track counting signal. The corrected track count signal is applied to a track counter in step 47. In step 48, the microcomputer determines if the system has finished tracking. This determination is made in the known way from the count produced by the track counter. If the optical head has not arrived at the target track as determined by the count in the track counter and by the destination track known to the microcomputer, the method continues. Otherwise, the process ends.

Correction-signal-forming step 43 further includes a step 44 for producing a rectangular wave whose frequency corresponds to the target speed in the detected error portion;

a step 45 for inverting the read out track counting signal; and a step 46 for performing an exclusive OR operation with respect to the rectangular wave formed by step 44 and the inverted counting signal of step 45.

The clock frequency of the track counting signal corresponding to the target speed is determined by an estimation of the speed at which the track is moving, with the aid of the access time of the designed system.

Accordingly, the track counting servo circuit of the present invention compensates the error portion of the track counting signal, to thereby produce an excellent effect in increasing the tracking accessing speed.

While the present invention has been particularly shown and described with reference to particular embodiments thereof, it will be understood by those skilled in the art that various changes in form and details may be effected therein without departing from the spirit and scope of the invention as defined by the appended claims. For example, the track count error detector 24 need not be of the specific form shown in FIG. 5, but may be any circuit that performs the function of detecting the track count error and developing a waveform defining error portion of the track count signal. The target speed rectangular wave generator 251 need not take the specific form in FIG. 5, but may be any circuit that performs the function of responding to a signal that defines the time of the track count error and generates, during that time, a rectangular wave signal that approximates the track count signal based on the target speed of tracking.

What is claimed is:

1. In an optical disk driving apparatus track counting servo circuit of the type having a pick up for reading track count signals and other data from a disk, a means for counting the track count signals read from the disk, and a microcomputer for controlling the movement of said pick up relative to said disk in response to a count from said track counting means and target track information, the improvement comprising:

track count signal error detecting means responsive to a first track count signal read by said pick up for detecting errors in an error portion of said first track count signal; and track count signal compensating means for generating a compensated track count signal according to said errors detected by said track count signal error detecting means and said first track count signal and for applying said compensated track count signal to said track count means so that said track count means counts said compensated track count signal.

2. A track counting servo circuit as claimed in claim 1, wherein said track count signal compensating means comprises:

a target velocity rectangular wave generator, responsive to a detection of said errors in said first track count signal by said track count signal error detecting means, for generating a rectangular waveform for a duration of said errors in said first track count signal, wherein said rectangular waveform has a frequency corresponding to a target velocity of movement of said pick up over tracks in said disk;

an inverter means responsive to said first track count signal for generating and outputting an inverted track count signal, wherein a portion of said inverted track count signal which corresponds to said errors in said first track count signal appears as a constant level signal; and an exclusive OR gate, wherein said inverted track count signal and said rectangular waveform are applied as inputs to said exclusive OR gate to produce said compensated track count signal.

3. A track counting servo system as claimed in claim 1, wherein said track count signal error detecting means comprises:

an inverter responsive to said first track count signal for inverting said first track count signal to produce an inverted track count signal, wherein a portion of said inverted track count signal which corresponds to said errors in said first track count signal has a constant level voltage;

an integrator for receiving said inverted track count signal and for integrating said inverted track count signal to produce an integrated inverted track count signal; and a square wave trigger circuit responsive to said integrated inverted track count signal for producing a square wave signal having one level during the error portion of said first track count signal and another level at all other times.

4. A track counting servo circuit as claimed in claim 3, wherein said track count signal compensating means comprises:

a target velocity rectangular wave generator, responsive to said square wave signal having one level during the error portion of said first track count signal and another level at all other times, for generating a rectangular waveform for a duration of said errors in said first track count signal, wherein said rectangular waveform has a frequency corresponding to a target velocity of movement of said pick up over tracks of said disk;

an inverter means, responsive to said first track count signal, for generating and outputting a second inverted track count signal, wherein a portion of said second inverted track count signal which corresponds to said errors in said first track count signal appears as a constant level signal; and an exclusive OR gate, wherein said second inverted track count signal and said rectangular waveform are applied as inputs to said exclusive OR gate to produce said compensated track count signal.

5. A track counting servo circuit as claimed in claim 4, wherein said target velocity rectangular wave generator comprises:

operational amplifier means for generating a continuous rectangular wave signal having a frequency corresponding to the target velocity of movement of said pick up over said tracks;

an output terminal; and means, responsive to said square wave signal having one level during the error portion of said first track count signal and another level at all other times, for grounding said rectangular wave signal at all times except during said duration of said errors in said first track count signal.

6. In an optical disk driving apparatus track counting servo circuit of the type having a pick up for reading track count signals and other data from a disk, a means for counting the track count signals read from the disk, and a microcomputer for controlling the movement of said pick up relative to said disk in response to a count from said track counting means and target track information, a track counting servo method comprising the steps of:

receiving a first track count signal read by said pick up;

detecting errors in said first track count signal;

generating a compensated track count signal in response to said errors detected in said first track count signal and in response to said first track count signal; and applying said compensated track count signal to said track count means so that said track count means counts said compensated track count signal.

7. A track counting servo method as claimed in claim 6, wherein the step of generating said compensated track count signal comprises:

generating and outputting a pulse waveform for a duration of said errors in said first track count signal in response to a detection of said errors in said track count signal, wherein said pulse waveform has a frequency corresponding to a target velocity of movement of said pick up over tracks of said disk;

generating and outputting an inverted track count signal in response to said first track count signal, wherein a portion of said inverted track count signal which corresponds to said errors in said first track count signal appears as a constant level signal; and performing an exclusive OR operation with respect to said pulse waveform and said inverted track count signal to thereby produce said compensated track count signal.

8. A track counting servo method as claimed in claim 7, wherein the step of detecting said errors comprises:

inverting said first track count signal to produce a second inverted track count signal, wherein a portion of said second inverted track count signal which corresponds to said errors in said first track count signal has a constant level voltage;

integrating said second inverted track count signal to produce an integrated inverted track count signal; and producing a square wave signal having one level during the error portion of said first track count signal and another level at all other times based on said integrated inverted track count signal.

9. A track counting servo method as claimed in claim 6, wherein the step of detecting said errors comprises:

inverting said first track count signal to produce an inverted track count signal, wherein a portion of said inverted track count signal which corresponds to said errors in said first track count signal has a constant level voltage;

integrating said inverted track count signal to produce an integrated inverted track count signal; and producing a square wave signal having one level during the error portion of said first track count signal and another level at all other times based on said integrated inverted track count signal.

10. An optical disk driving apparatus track counting servo circuit comprising:

a pick up for reading track count signals and other data from a disk;

track counting means for counting the track count signals read from the disk;

a microcomputer for controlling the movement of said pick up relative to said disk in response to a count from said track counting means and target track information;

track count signal error detecting means responsive to a first track count signal read by said pick up for detecting errors in an error portion of said first track count signal; and track count signal compensating means for generating a compensated track count signal according to said errors detected by said track count signal error detecting means and said first track count signal and for applying said compensated track count signal to said track count means so that said track count means counts said compensated track count signal.

11. A track counting servo circuit as claimed in claim 10, wherein said track count signal compensating means comprises:

a target velocity rectangular wave generator, responsive to a detection of said errors in said first track count signal by said track count signal error detecting means, for generating a rectangular waveform for a duration of said errors in said first track count signal, wherein said rectangular waveform has a frequency corresponding to a target velocity of movement of said pick up over tracks in said disk;

an inverter means responsive to said first track count signal for generating and outputting an inverted track count signal, wherein a portion of said inverted track count signal which corresponds to said errors in said first track count signal appears as a constant level signal; and an exclusive OR gate, wherein said inverted track count signal and said rectangular waveform are applied as inputs to said exclusive OR gate to produce said compensated track count signal.

12. A track counting servo system as claimed in claim 10, wherein said track count signal error detecting means comprises:

an inverter responsive to said first track count signal for inverting said first track count signal to produce an inverted track count signal, wherein a portion of said inverted track count signal which corresponds to said errors in said first track count signal has a constant level voltage;

an integrator for receiving said inverted track count signal and for integrating said inverted track count signal to produce an integrated inverted track count signal; and a square wave trigger circuit responsive to said integrated inverted track count signal for producing a square wave signal having one level during the error portion of said first track count signal and another level at all other times.

13. A track counting servo circuit as claimed in claim 12, wherein said track count signal compensating means comprises:

a target velocity rectangular wave generator, responsive to said square wave signal having one level during the error portion of said first track count signal and another level at all other times, for generating a rectangular waveform for a duration of said errors in said first track count signal, wherein said rectangular waveform has a frequency corresponding to a target velocity of movement of said pick up over tracks of said disk;

an inverter means, responsive to said first track count signal, for generating and outputting a second inverted track count signal, wherein a portion of said second inverted track count signal which corresponds to said errors in said first track count signal appears as a constant level signal; and an exclusive OR gate, wherein said second inverted track count signal and said rectangular waveform are applied as inputs to said exclusive OR gate to produce said compensated track count signal.

14. A track counting servo circuit as claimed in claim 13, wherein said target velocity rectangular wave generator comprises:

operational amplifier means for generating a continuous rectangular wave signal having a frequency corresponding to the target velocity of movement of said pick up over said tracks;

an output terminal; and means, responsive to said square wave signal having one level during the error portion of said first track count signal and another level at all other times, for grounding said rectangular wave signal at all times except during said duration of said errors in said first track count signal.

* * * * *